(12) United States Patent
Gull et al.

(10) Patent No.: US 8,070,331 B2
(45) Date of Patent: Dec. 6, 2011

(54) SUSPENSION

(75) Inventors: Kurt Gull, Tuttlingen (DE); Dieter Mann, Balgheim (DE)

(73) Assignee: Berchtold Holding GmbH, Tuttlingen (DE)

( * ) Notice: Subject to any disclaimer, the term of this patent is extended or adjusted under 35 U.S.C. 154(b) by 315 days.

(21) Appl. No.: 12/393,271

(22) Filed: Feb. 26, 2009

(65) Prior Publication Data

US 2009/0213596 A1  Aug. 27, 2009

(30) Foreign Application Priority Data

Feb. 26, 2008  (DE) .................. 10 2008 011 129

(51) Int. Cl.
*F21V 19/02* (2006.01)
*F21V 21/06* (2006.01)
(52) U.S. Cl. .......... 362/389; 362/33; 362/572; 362/418; 362/285
(58) Field of Classification Search .................. 362/389, 362/33, 572, 573, 804, 418, 419, 420, 285, 362/287, 382, 404–406
See application file for complete search history.

(56) References Cited

U.S. PATENT DOCUMENTS

| 3,240,925 | A | * | 3/1966 | Paschke et al. | ................. 362/33 |
| 5,497,295 | A | * | 3/1996 | Gehly | ............................ 362/405 |
| 6,471,363 | B1 | * | 10/2002 | Howell et al. | .................... 362/33 |
| 6,513,962 | B1 | | 2/2003 | Mayshack et al. | |
| 7,726,823 | B2 | * | 6/2010 | Rus et al. | ......................... 362/33 |

FOREIGN PATENT DOCUMENTS

| DE | 37 01 172 C2 | 7/1988 |
| EP | 0 392 303 A1 | 10/1990 |

OTHER PUBLICATIONS

German Search Report and Translation of German Search Report dated Jun. 17, 2008 related to corresponding German Patent Application No. 10 2008 011 129.5, 9 pages.

* cited by examiner

*Primary Examiner* — Bao Q Truong
(74) *Attorney, Agent, or Firm* — Lewis and Roca LLP

(57) ABSTRACT

A suspension has a holding element to which an arm is rotatably fastened, wherein a coupling element is provided which is rotatable around the holding element independently of the arm and which forms a security against rotation.

8 Claims, 1 Drawing Sheet

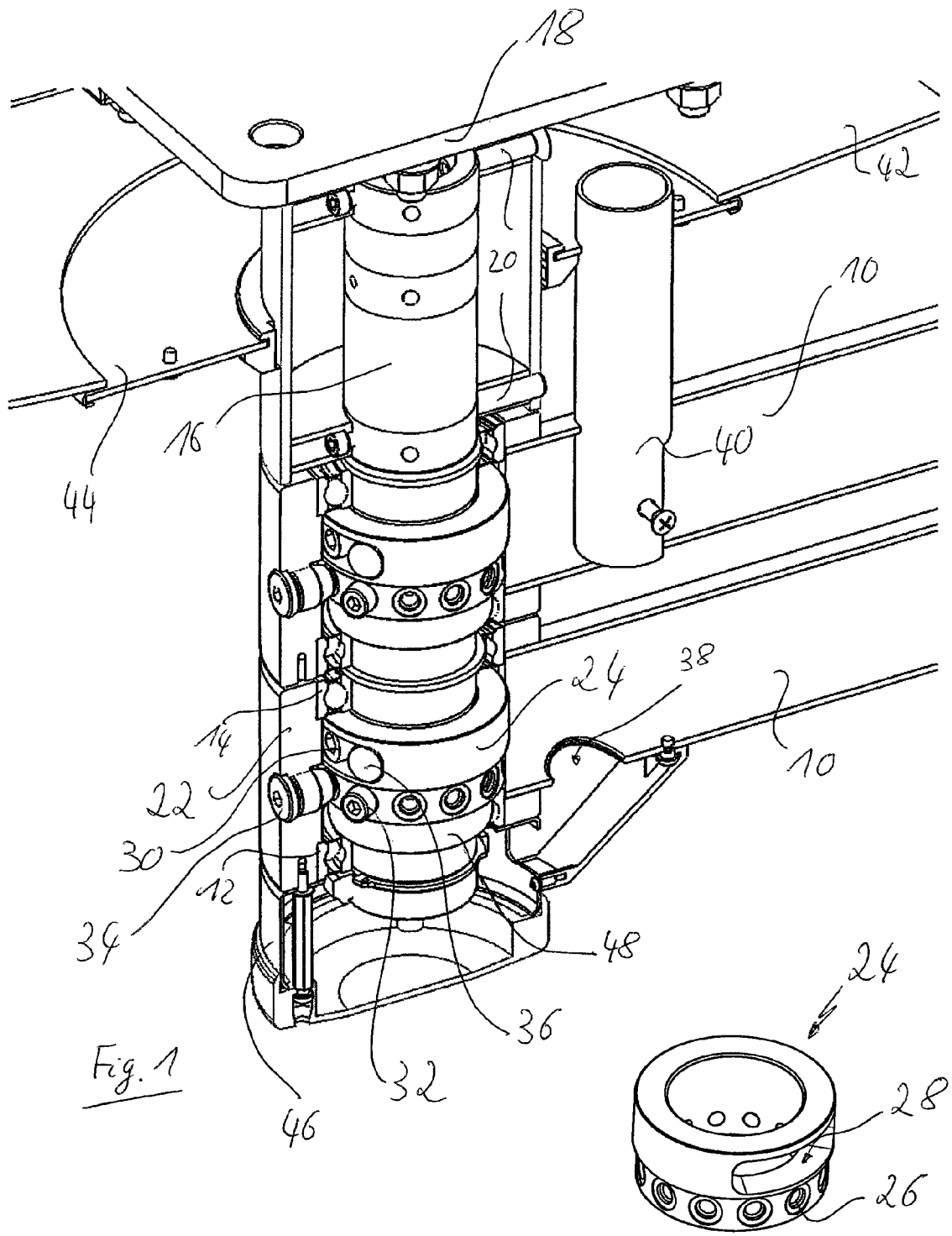

SUSPENSION

CROSS-REFERENCE TO RELATED APPLICATIONS

This application is claims priority to co-pending German Application Serial Number 102008011129.5, filed Feb. 26, 2008, the entirety of which is incorporated by reference herein.

BACKGROUND OF THE INVENTION

Field of the Invention

The present invention relates to a suspension for a device, in particular for a surgical light.

Such suspensions are generally known and serve to fasten the device or electrical device rotatably to the ceiling or to a stand. Since an electrical device is provided with electrical supply lines, they are guided through the arm and through a holding element to which the arm is rotatably fastened. It is problematic in this respect that a rotation by more than 360° has to be prevented since there is otherwise a danger that the electrical supply lines break off. It can also be desirable to limit the pivot range of the arm in devices without electrical cables.

BRIEF DESCRIPTION OF THE INVENTION

It is the object of the invention to provide a suspension for a device which has a security against rotation and which has a simple and compact construction.

This object is satisfied by the features of claim 1 and in particular in that a coupling element is provided which is rotatable around the holding element independently of the arm and which can come into engagement with the arm, on the one hand, and with an abutment provided at the holding element, on the other hand, to prevent any rotation of the arm around the holding element by more than 360°.

There is therefore no direct abutment between the arm and the holding element due to the coupling element in accordance with the invention, but the security against rotation rather takes place via the coupling element which is rotatable around the holding element independently of the arm. Not only a good setting of pivot region of the holding arm can be achieved using such a coupling element. An extremely compact construction is furthermore made possible which can be realized cost-effectively both from a construction and a technical manufacturing aspect.

Advantageous embodiments of the invention are described in the description, in the drawing and in the dependent claims.

In accordance with a first advantageous embodiment, the coupling element can be a rotatable ring. Such a rotatable ring can be rotatably mounted onto the holding element so that the independent pivotability of the arm and the rotatable ring is ensured.

In accordance with a further advantageous embodiment, the rotatable ring can be provided with a window at its periphery into which the abutment of the holding element projects. The rotatable ring can be rotated around the holding element in this manner, with the rotation range corresponding to the peripheral extent of the window. The compact construction is further facilitated by the overlapping arrangement of the abutment and rotatable ring.

In accordance with a further advantageous embodiment, a damper can be provided in the window at both sides of the abutment projecting into the window, for example a body made of elastic solid material. It has namely been found in practical trials that the provision of a damper in the coupling element considerably reduces the transmission of blows from the arm onto the holding element when the arm has reached the end of its pivot range.

In accordance with a further advantageous embodiment, the coupling element can have a variable position blocking element via which the coupling element comes into engagement with the arm. The coupling element or the rotatable ring can, for example, have receivers or bores for the blocking element spaced apart uniformly over its periphery. In this case, the blocking element, for example s threaded bolt, can be screwed in one of the bores which corresponds to a desired pivot range.

In accordance with a further advantageous embodiment, the arm can have a housing comprising the holding element which is completely closed with the exception of a bore for a stop bolt. This embodiment has the great advantage that only a single opening is provided in the region of the housing, which plays a great role under hygienic aspects in the area of an operating room since all the units in an operating room always have to be cleaned. Since every bore, recess or unevenness of a unit can only be cleaned poorly or with increased difficulty, surfaces which are as smooth as possible are preferred in all units which are used inside an operating room.

In accordance with a further advantageous embodiment, the coupling element, in particular the rotatable ring, can be received fully in the housing of the arm which surrounds the holding element, for example a hollow shaft. In this embodiment, an extremely compact construction results in which all the parts required for the security against rotation are received within the housing and in which in particular only a single blocking screw emerges outwardly from the housing.

BRIEF DESCRIPTION OF THE DRAWING FIGURES

The present invention will be described in the following purely by way of example with reference to an advantageous embodiment and to the enclosed drawings. There are shown:

FIG. 1 a perspective sectional representation of a suspension; and

FIG. 2 a perspective view of a rotatable ring of the suspension of FIG. 1.

DETAILED DESCRIPTION OF THE INVENTION

FIG. 1 shows a suspension for two surgical lights (not shown) which are each fastened to the outer end of an arm 10. The arm 10 is rotatably fastened via two ball bearings 12 and 14 on a holding element in the form of a hollow shaft 16, with the shaft 16 being screwed to a mounting flange 18 via two threaded bolts 20.

At the end of the arm 10 recognizable in FIG. 1, the arm is provided with a housing 22 which extends in the peripheral direction and which surrounds the shaft 16 as well as the two ball bearings 12 and 14. Furthermore, a coupling element in the form of a rotatable ring 24 is received inside the housing 22, said rotatable ring being freely rotatably mounted onto the shaft 16 and thus being rotatable around the shaft 16 independently of the arm 10 or the housing 22.

The rotatable ring 24 is shown separately in FIG. 2 and in the embodiment shown has a total of twelve bores 26 mutually spaced apart by 30° in each case in the peripheral direction along its periphery in its lower region. In its upper region, the rotatable ring 24 is provided with a window 28 which extends in the peripheral direction and whose extent in the peripheral direction amounts to approximately 65°.

As FIG. 1 illustrates, a threaded bolt 30 is screwed to the shaft 16 through the window 28 of the rotatable ring 24, with the threaded bolt 30 serving as a stationary end abutment for the arm 10. A further threaded bolt 32, which serves as a variable position blocking element for the arm 10 or for the housing 22 connected thereto, is furthermore screwed into one of the bores 26 of the rotatable ring 24 in the embodiment shown. A single passage bore is namely provided in the outer wall of the housing 22 through which a blocking screw 34 is screwed whose front end extends up to and into the region of the outer periphery of the rotatable ring 24 so that the blocking screw 34 can abut the threaded bolt 32 on a complete rotation of the arm 10 around the shaft 16.

To damp the abutment of the arm 10 at its end abutment 30, two dampers 36 (only the right hand damper 36 can be recognized in FIG. 1) are furthermore provided in the window 28 and are arranged at both sides of the threaded bolt 30 serving as an abutment. The two dampers 36 are made in the shape of truncated cylinders and are made from elastic solid material which has rubber-like damping properties.

The security against rotation of the suspension shown works as follows: When the arm 10 is pivoted counterclockwise around the shaft 16, it can rotate for so long until the blocking screw 34 moves into the position shown in FIG. 1 in which said blocking screw approaches the threaded bolt 32 which is screwed in a bore 26 of the rotatable ring 24. After the blocking screw 34 has abutted the threaded bolt 32, the rotatable ring 24 moves together with the arm 10 counterclockwise until the left hand damper 36 not recognizable in FIG. 1 abuts the abutment 30. In this respect, the arising blow is damped by the damper and is not transmitted to the shaft 16 or to the mounting flange 18. When the arm 10 is rotated clockwise, this is possible for so long until the blocking screw 34 approaches the threaded bolt 32 from the right in FIG. 1 and abuts it. Subsequently, the rotatable ring 24 likewise moves clockwise and again for so long until the damper 36 recognizable in FIG. 1 abuts the blocking screw 34.

A pivot range of the arm of approximately 360° can be achieved with the embodiment described above in which only a single threaded bolt 32 is screwed into the rotatable ring 24. It is easily understandable that a correspondingly reduced pivot range can be achieved by screwing two threaded bolts 32 into the rotatable ring 24.

The electrical supply lines, not shown, of the surgical light are guided through the interior of the hollow arm 10 and reach from there through an opening 38 to the lower side of the downwardly open shaft 16 and can subsequently be guided through the shaft 16 up to and into the region of the mounting flange 18.

Furthermore, a total of two pivot arms 10 are provided in the embodiment shown whose suspension is of an identical design. In this respect, the detailed description of the suspension of the upper pivot arm 10 is not repeated. To be able to lead the electrical supply lines of the surgical light fastened to the upper pivot arm 10 into the region of the ceiling suspension, a tube socket 40 is introduced into the upper pivot arm 10 which extends up to and into the region of a covering 42 provided at the ceiling. Since the tube socket 40 rotates together with the pivot arm 10 around the shaft 16, a pivot cover 44 rotatable together with the tube socket 40 is provided in the region of the covering 42 and contacts the covering 42 in a sealed manner. A cover 46 is equally screwed to the lower side of the lower housing 22 and can rotate together with the pivot arm 10. The reference numeral 48 designates a brake ring fixedly connected to the shaft 16.

The invention claimed is:

1. A suspension for a device, in particular for a surgical light, having a holding element to which at least one arm is rotatably fastened, wherein a coupling element is provided which is rotatable around the holding element independently of the arm and which can enter into engagement with the arm, on the one hand, and with an abutment provided at the holding element, on the other hand, to prevent a rotation of the arm around the holding element by more than 360°, the coupling element being in the form of a rotatable ring having a peripheral window into which the abutment projects.

2. A suspension for a device, in particular for a surgical light, having a holding element to which at least one arm is rotatably fastened, wherein a coupling element is provided which is rotatable around the holding element independently of the arm and which can enter into engagement with the arm, on the one hand, and with an abutment provided at the holding element, on the other hand, to prevent a rotation of the arm around the holding element by more than 360°, the coupling element being in the form of a rotatable ring having a peripheral window into which the abutment projects, with a damper being provided in the window at both sides of the abutment.

3. A suspension in accordance with claim 1 or 2, characterized in that the coupling element has a variable position blocking element via which the coupling element comes into engagement with the arm.

4. A suspension for a device, in particular for a surgical light, having a holding element to which at least one arm is rotatably fastened, wherein a coupling element is provided which is rotatable around the holding element independently of the arm and which can enter into engagement with the arm, on the one hand, and with an abutment provided at the holding element, on the other hand, to prevent a rotation of the arm around the holding element by more than 360°, the coupling element having a variable position blocking element via which the coupling element comes into engagement with the arm, receivers for the blocking element being spaced apart uniformly over a periphery of the coupling element.

5. A suspension in accordance with claim 2, characterized in that the damper is a body of elastic material.

6. A suspension in accordance with any one of claims 1, 2, or 4, characterized in that the holding element is a hollow shaft.

7. A suspension in accordance with any one of claims 1, 2, or 4, characterized in that the arm has a housing which surrounds the holding element and which is fully closed with the exception of a bore for a screw, with in particular a screw located in the bore serving as a blocking element for the arm.

8. A suspension in accordance with claim 7, characterized in that the coupling element is completely received in the housing.

* * * * *